United States Patent

Franklin et al.

[11] Patent Number: 5,986,573
[45] Date of Patent: *Nov. 16, 1999

[54] METHOD AND APPARATUS FOR METERING BUILDING STRUCTURES

[75] Inventors: Mark Terrance Franklin, San Diego; John Elwood McGregor, III, Encinitas, both of Calif.

[73] Assignee: Water Savers, Inc., San Diego, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/746,910

[22] Filed: Nov. 19, 1996

Related U.S. Application Data

[63] Continuation-in-part of application No. 08/751,334, Nov. 18, 1996, Pat. No. 5,892,158, which is a continuation-in-part of application No. 08/633,537, Apr. 17, 1996, Pat. No. 5,764,158, which is a continuation-in-part of application No. 08/560,161, Nov. 20, 1995, abandoned.

[51] Int. Cl.$^6$ .................................................. G08B 23/00
[52] U.S. Cl. .................................. 340/870.02; 340/870.11; 340/606; 73/195; 137/552; 705/412
[58] Field of Search ........................ 340/606, 870.02, 340/870.03, 870.11; 73/195; 137/552, 555, 624.11, 624.12; 705/412, 413

[56] References Cited

U.S. PATENT DOCUMENTS

| | | | |
|---|---|---|---|
| 4,729,106 | 3/1988 | Rush et al. | 364/510 |
| 4,888,706 | 12/1989 | Rush et al. . | |
| 4,951,224 | 8/1990 | Hokynar | 340/606 |
| 5,161,563 | 11/1992 | Thompson | 137/1 |
| 5,199,307 | 4/1993 | Onoda et al. . | |
| 5,381,136 | 1/1995 | Powers et al. . | |
| 5,441,070 | 8/1995 | Thompson | 137/552 |
| 5,448,230 | 9/1995 | Schanker et al. . | |
| 5,502,652 | 3/1996 | Hoggatt et al. | 705/412 |
| 5,721,383 | 2/1998 | Franklin et al. | 73/861.77 |

*Primary Examiner*—Michael Horabik
*Assistant Examiner*—Timothy Edwards, Jr.
*Attorney, Agent, or Firm*—Higgs, Fletcher&Mack LLP; Bernard L. Kleinke

[57] ABSTRACT

A method and apparatus for metering building structures having a plurality of service outlets each having control valves, includes the installing of meters within a given distance from each one of the valves. A transmission system is coupled electrically to each one of the meters for sending meter readings periodically to a remotely located equipment.

22 Claims, 3 Drawing Sheets ages573

METHOD AND APPARATUS FOR METERING BUILDING STRUCTURES

CROSS-REFERENCE TO RELATED APPLICATIONS

This application is a continuation-in-part patent application of U.S. Pat. application Ser. No. 08/751,334, filed Nov. 18, 1996, now U.S. Pat. No. 5,892,158 and entitled "METHOD FOR INSTALLING A FLOW METER SYSTEM AND FLOW METER APPARATUS THEREFOR", which is a continuation-in-part patent application of U.S. Pat. application Ser. No. 08/633,537, filed Apr. 17, 1996, now U.S. Pat. No. 5,764,158 and entitled "METER READING DATA TRANSMISSION SYSTEM AND METHOD OF USING SAME", which is a continuation-in-part patent application of U.S. Pat. application Ser. No. 08/560,161, filed Nov. 20, 1995, now abandoned, and entitled "FLOW METER AND METHOD OF USING SAME." The foregoing patent applications are each incorporated herein by reference as if fully set forth herein.

TECHNICAL FIELD

The present invention relates in general to a method and apparatus for metering building structures, and it more particularly relates to the metering of individual building structure units, such as apartment units, for utility consumption by the residents or other users.

BACKGROUND ART

In the past, large building structures, such as apartment buildings and condominium buildings have been metered for utility consumption, such as water usage, by metering the main service line, such as the main water line for the entire building structure. In this manner, the utility company has billed the owners for the utility usage as opposed to each individual unit resident or owner.

In the case of a condominium building structure, where each unit is owned separately, the utility company typically has submitted its billing statement to the condominium association of owners, which essentially has assessed each unit owner equally. In some condominium building structures, special supply lines, such as individual unit water supply lines, are installed initially to enable individual meters to be employed for each condominium unit separately. In this manner, billing statements have been submitted to each individual unit owner so that the unit owners are able to pay for their prorated portion of the utility consumption. In this manner, a more equitable payment system is possible.

However, in the case of other types of building structures, such as apartment buildings and commercial buildings, it was not possible to meter individual units in a convenient and reliable manner. For example, in the case of water consumption, there have been no single service lines provided for each unit. Instead, each unit has had a series of pairs of hot and cold water lines for different rooms, such as bathrooms and kitchens, shared in common with other units. This is particularly true where there are several stories to the buildings. In this manner, a whole group of pairs of hot and cold water supply pipes or lines extend to supply vertically aligned units such as an apartment unit. Thus, each unit shares many different hot and cold water supply pipes with other units in the same building structure. Thus, such a building structure is not designed for individually metering units. In this regard, due to the large number of commonly shared supply lines for each unit, it has not been economically feasible, nor convenient, to meter individual units.

Therefore, it would be highly desirable to have a new and improved method and apparatus for metering building structures, where individual units can be metered to enable the residents or users of each unit to be billed a prorated share of their individual utility usage. Such a new and improved metering method and apparatus should be relatively inexpensive to install and to read such meters. Also, such methods and apparatus should be useful for both existing and new building structures, without the requirement for special plumbing or customized building requirements.

SUMMARY OF THE INVENTION

Therefore, the principal object of the present invention is to provide a new and improved method and apparatus for metering building structures, wherein each unit within the building structure can be metered individually for the prorated share of utility usage in a convenient manner, without customized or special building supply line requirements.

Another object of the present invention is to provide such a new and improved metering method and apparatus, which is both relatively inexpensive to install and to use thereafter.

A further object of the present invention is to provide such a new and improved metering method and apparatus for both new and existing building structures, where existing structures can be readily retrofitted.

Briefly, the above and further objects of the present invention are realized by providing a metering method and apparatus which can enable individual units to be economically and conveniently metered for utility consumption purposes.

A method and apparatus for metering building structures having a plurality of service outlets each having control valves, includes the installing of meters within a given distance from each one of the valves. A transmission system is coupled electrically to each one of the meters for sending meter readings periodically to a remotely located equipment.

Thus, the novel method and apparatus of the present invention enables the metering of both new and existing building structures in a low cost and convenient manner. In this regard, by providing the low-cost meters constructed in accordance with the present invention and installing them in accordance with the inventive method, the installation cost is relatively inexpensive, even though a group of meters may be required for each individual unit of a building structure. Similarly, due to the transmission configuration, the installation cost is greatly reduced or minimized, and the follow-on reading of the meters periodically is greatly facilitated, since the meters can be read without human intervention.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
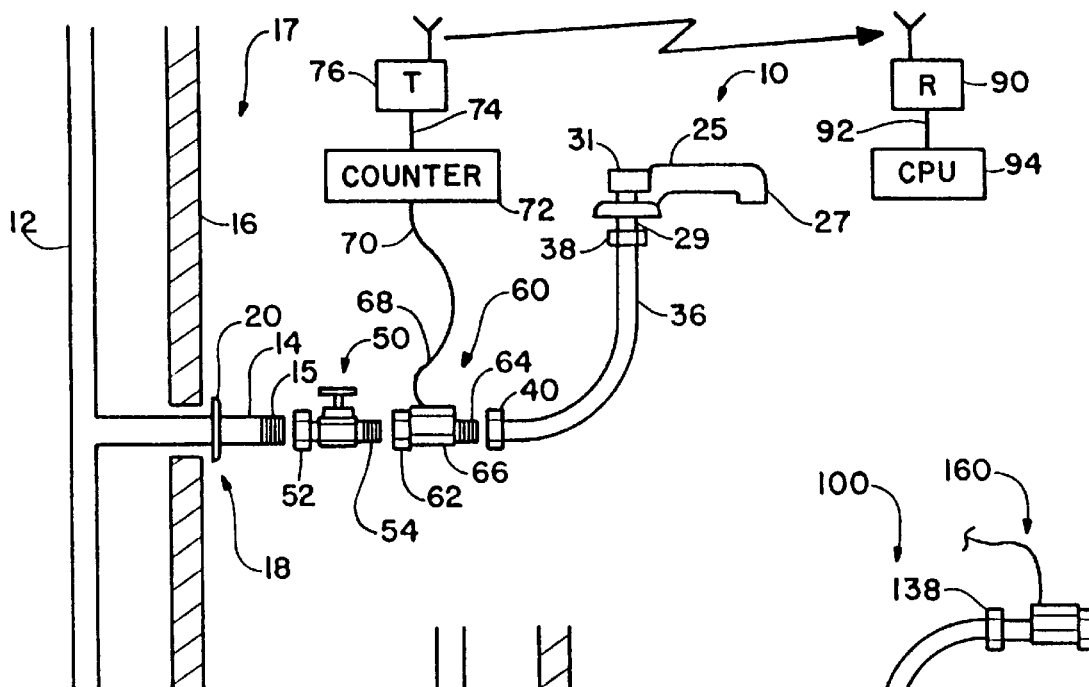
FIG. 1 is an elevation view of a meter arrangement, which is constructed and installed in accordance with the method and apparatus of the present invention.

Referring now to the drawings, and more particularly to FIG. 1 thereof, there is shown a meter arrangement 10, which is constructed and installed in accordance with the present invention. The arrangement 10 is shown and described as a bathroom sink meter arrangement, and is coupled between a water supply pipe 12 behind a building structure wall 16 of a unit (not shown) of a building structure generally indicated at 17, and a fixture or outlet, such as bathroom sink faucet fixture 25 mounted on a bathroom sink basin (not shown), to facilitate monitoring remotely the supply of water to the faucet fixture 25.

The water supply pipe 12 is coupled in fluid communication with a water main (not shown) located upstream from the arrangement 10 to supply water thereto. The pipe 12 is shown in FIG. 1 rising vertically to supply water to multiple floors of the structure 17. Thus, the pipe 12 supplies water to different levels of a single dwelling or commercial building structure, or the pipe 12 could supply water to several vertically aligned dwellings such as condominiums or apartments.

It will be understood by one skilled in the art that cold water supply pipes and hot water supply pipes are often located in close proximity to one another to supply cold and hot water to fixtures. The cold and hot water supply pipes are substantially similar in construction, thus only the cold water supply pipe 12 is shown in FIG. 1 to simplify the illustration and description of the present invention.

To supply water to the fixture 25, a stub out pipe 14 extends perpendicularly from the water supply line pipe 12 through an opening 18 in the wall 16. The stub out pipe 14 terminates in a threaded nipple 15. An escutcheon plate 20 is disposed about the stub out pipe 14 to enclose the opening 18.

The faucet fixture 25 includes a spout 27 coupled to a faucet tailpiece 29 for dispensing the water. A handle 31 controls a valve (not shown) to vary the amount of cold water supplied through the spout 27. Similarly, another handle (not shown) controls the amount of hot water supplied.

A shut-off valve or angle stop 50 having a threaded female end 52 and a threaded male end 54 is coupled to the stub out pipe 14 at the nipple 15 thereof to control the amount of water drawn from the water pipe 12. The shut-off valve 50 is a conventional device and does not require modification to cooperate with the arrangement 10.

A flow meter 60 having a threaded female end 62, a threaded male end 64 and a sensor portion 66 is disposed in fluid communication with the shut-off valve 50 to monitor the flow of water to the faucet fixture 25. A suitable flow meter is described in copending U.S. Pat. application Ser. No. 08/560,161, which application is incorporated by reference as if fully set forth herein.

An electrical conductor 68 coupled to a sensor (not shown) in the sensor portion 66 conducts an electrical signal counter 72 for accumulating information indicative of the amount of water passing through the meter 60. The counter 72 is connected electrically to a remote transmitter device 76 by a conductor 74 to facilitate remote monitoring. The transmitter device 76 transmits a quantity signal to a remotely located receiving device 90 indicative of the quantity of water passing through the meter 60. A computer processing unit (CPU) 94 connected electrically to the receiving device 90 by conductor 92 processes the quantity signal for the meter 60 to facilitate the remote monitoring of the water supplied to the fixture 25.

A water supply tube 36 having coupling nuts 38 and 40 is disposed between the faucet tailpiece 29 and the threaded male end 64. The water supply tube 36 may be substantially rigid, however, the tube 36 is preferably flexible to enable the arrangement 10 to be adapted for use with various types of fixtures.

Generally, the faucet fixture 25 is located in close proximity to the stub out pipe 14 and the shut-off valve 50. Thus, by installing the flow meter 60 near the shut-off valve 50, the flow meter 60 can be installed quickly and easily to enable the water supplied by the fixture 25 to be monitored separately from any other fixture or outlet. Preferably, the flow meter 60 is disposed about one foot from the shut-off valve 50.

Installing the arrangement 10 is accomplished by securing threadably the shut-off valve 50 to the threaded nipple 15 of the stub out pipe 14. For some installations, the shut off valve 50 may already be coupled threadably to the stub out pipe 14, thereby eliminating the need to install the shut-off valve 50.

The flow meter 60 is coupled threadably to the shut-off valve 50 at the male end 54 thereof. The electrical conductor 68 is connected electrically to the counter 72, and the counter 72 is in turn connected electrically to the transmitter 76 as described in U.S. Pat. application Ser. No. 08/560,161.

The receiver 90 is positioned within transmission distance of the transmitter 76 to receive the quantity signal. The CPU 94 is connected to the receiver 90 by the conductor 92. The CPU 94 can be located near the receiver 90, or it may be located far from the receiver 90, to provide flexibility in the arrangement 10. The installation is completed by coupling the water supply tube 36 between the male end 64 of the flow meter 60 and the faucet tailpiece 29 with the coupling nuts 40 and 38, respectively. As a result, the stub out pipe 14 is in fluid communication with the faucet fixture 25 via the shut-off valve 50, the flow meter 60 and the tube 36.

It will be understood by one skilled in the art that the male and female ends may be reversed in some applications. However, the locations of these ends as described herein may be modified to accommodate the particular situation without requiring undue experimentation.

In general, the inventive metering method and apparatus relates to the installing of a single meter within a given distance from each one of the shut-off valves in a building structure, such as the valve 50. The meters are then coupled electrically through a transmission system, such as the counter 72, the transmitter 76 and the receiver 90, for sending meter readings periodically, such as monthly, to a remotely located unit, such as the computer processor unit 94. In the arrangement 10 of FIG. 1, the meter is installed downstream of the valve 50 between it and the outlet 27. The meter 66 in FIG. 1 is disposed adjacent to the valve 50. In general, as hereinafter described in greater detail, the meter may be disposed downstream of the meter anywhere between the valve and the outlet.

As hereinafter described in greater detail, the meter can also be installed upstream of the valve at a distance of up to one foot therefrom. When installed upstream of the valve, the meter can be installed adjacent to the valve on the upstream side thereof.

Figure 2:
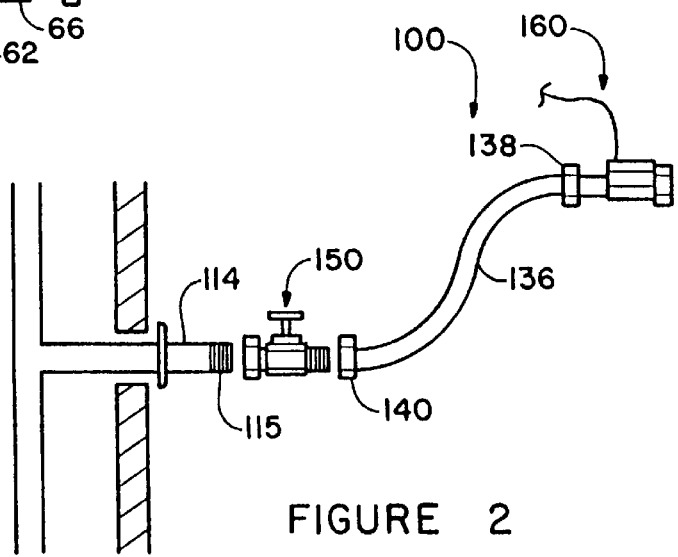
FIG. 2 is an elevation view of another meter arrangement, which is also constructed and installed in accordance with the method and apparatus of the present invention.

Referring now to FIG. 2, there is shown another flow meter arrangement 100, which is also constructed and installed in accordance with the present invention. The flow meter arrangement 100 is substantially similar to the flow meter arrangement 10, and includes a shut-off valve 150, a flow meter 160 and a water supply tube 136 having coupling nuts 138 and 140. The arrangement 100 enables the supply of water to a toilet tank (not shown) to be monitored remotely.

The shut-off valve 150 of the arrangement 100 is coupled threadably to a nipple 115 of a stub out pipe 114. The meter 160 is coupled threadably to the toilet tank and the tube 136 is interposed between the shut-off valve 150 and the flow meter 160.

The installation of the flow meter arrangement 100 is accomplished in a similar manner as the installation of the flow meter arrangement 10, except that the relative positions of the tube 136 and the flow meter 160 are reversed. In this regard, the tube 136 is coupled directly to the shut-off valve 150 via a coupling nut 140. The flow meter 160 is coupled to the other end of the tube 136 by a coupling nut 138.

Figure 3:
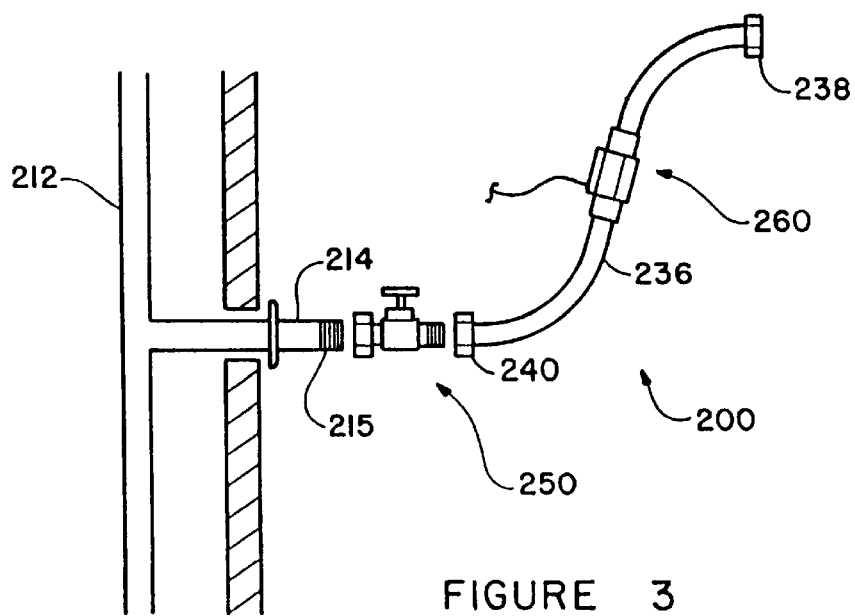
FIG. 3 is an elevation view of a further meter arrangement, which is also constructed and installed in accordance with the method and apparatus of the present invention.

Referring now to FIG. 3, there is shown yet another flow meter arrangement 200 which is also constructed and installed in accordance with the present invention. The arrangement 200 is substantially similar to the arrangement 10 (FIG. 1) and facilitates the coupling of a kitchen sink faucet fixture (not shown) to the water supply pipe 212. The arrangement 200 includes a shut-off valve 250 coupled threadably to a nipple 215 of a stub out pipe 214. The arrangement 200 further includes a flow meter 260 disposed at an intermediate portion of a water supply tube 236, and in fluid communication therewith. Coupling nuts 238 and 240 of the tube 236 enable the tube 236 and flow meter 260 to be coupled between the kitchen sink faucet fixture and the shut-off valve 250.

As shown in FIG. 3, the flow meter 260 is integrally connected to the tube 236. However, it will be understood by one skilled in the art that the tube 236 could comprise two separate portions, wherein the flow meter 260 is disposed therebetween.

When installing the previously described meter arrangements 10, 100 and 200 of FIGS. 1–3, the flow of water to the respective fixture can be terminated by the shut-off valves 50, 150 and 250, respectively. As a result, the coupling of the flow meters 60, 160 and 260 with the tubes 36, 136 and 336 can be accomplished without closing the main valve (not shown) for the water supply pipes, such as pipe 12 (FIG. 1). However, other installations are also possible, and are also contemplated, wherein the main valve is closed to enable installation of the meter arrangements.

Figure 4:
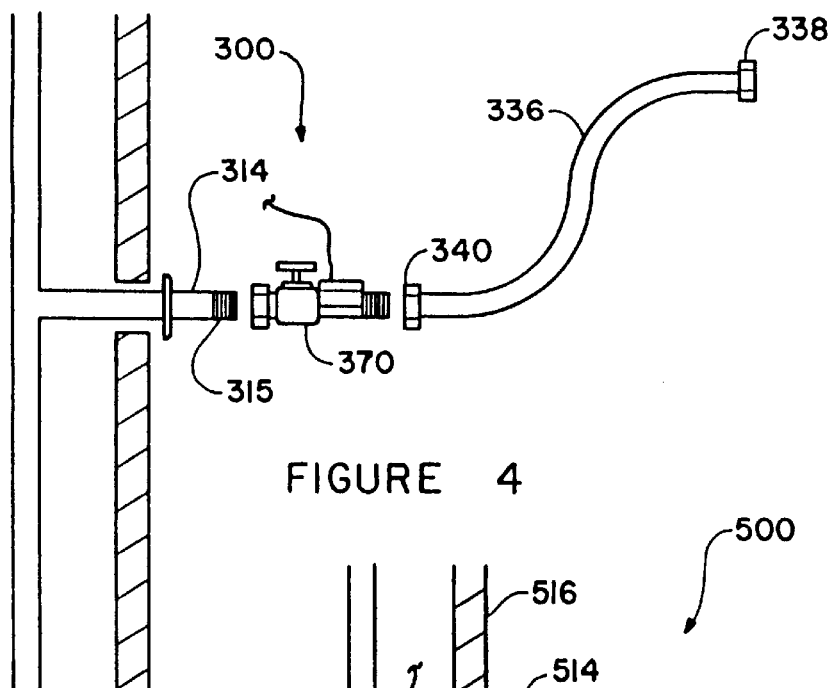
FIG. 4 is an elevation view of another meter arrangement, which is also constructed and installed in accordance with the method and apparatus of the present invention.

Referring now to FIG. 4, there is shown a flow meter arrangement 300 which is also constructed and installed in accordance with the present invention for monitoring the amount of water supplied to a dishwasher (not shown), and which requires a main valve (not shown) to be closed prior to installation. The arrangement 300 is similar to the arrangement 10 of FIG. 1, and includes a stub out pipe 314 having a nipple 315 and a water supply tube 336 having coupling nuts 338 and 340.

Unlike the arrangement 10 (FIG. 1), the arrangement 300 includes a flow meter/shut-off valve combination device 370 for controlling the water supplied and for monitoring the amount of supplied water. The combination device 370 is disposed between the tube 336 and the stub out pipe 314, and enables the flow of water supplied to the dishwasher to be controlled and monitored.

The arrangement 300 is installed by initially closing the main valve. Where an existing shut-off valve (not shown) is coupled to the stub out pipe 314, the existing shut-off valve must be removed prior to installing the flow meter/shut-off valve combination device 370. Subsequently, the tube 336 is coupled between the dishwasher and the device 370.

Figure 5:
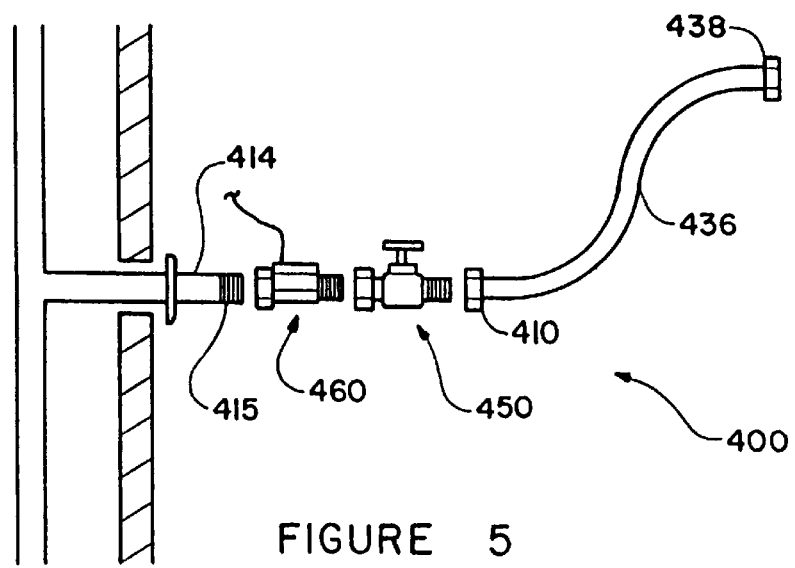
FIG. 5 is an elevation view of another meter arrangement, which is also constructed and installed in accordance with the method and apparatus of the present invention.

Referring now to FIG. 5, there is shown another flow meter arrangement 400 which is also constructed and installed in accordance with the present invention for monitoring the supply of water to a clothes washing machine (not shown). The arrangement 400 is substantially similar to the arrangement 10 (FIG. 1), except that the relative positions of a shut-off valve 450 and a flow meter 460 are reversed relative to the positions of the shut-off valve 50 and flow meter 60 of the arrangement 10. As a result, the flow meter 460 is coupled to a nipple 415 of a stub out pipe 414, thereby disposing the flow meter 460 between the stub out pipe 414 and the shut-off valve 450.

Prior to coupling the flow meter 460 to the stub out pipe 414, a main valve (not shown) must be closed to stop the flow of water out of the stub out pipe 414. The flow meter 460 can then be coupled threadably to the nipple 415. The shut-off valve 450 is disposed between the flow meter 460 and a water supply tube 436 having coupling nuts 438 and 440. The nuts 438 and 440 are secured to the washing machine and the valve 450, respectively, to complete the connections between the stub out pipe 414 and the dishwasher. The main valve may then be opened to supply water to the fixture.

Figure 6:
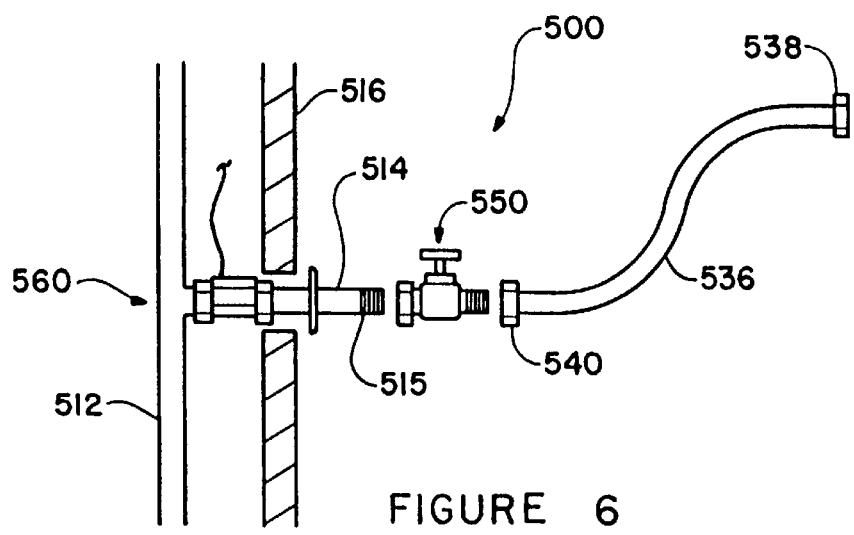
FIG. 6 is an elevation view of a further meter arrangement, which is also constructed and installed in accordance with the method and apparatus of the present invention.

Referring now to FIG. 6, there is shown yet another flow meter arrangement 500 which is also constructed and installed in accordance with the present invention. The arrangement 500 includes a stub out pipe 514 having a nipple 515, a shut-off valve 550 and a water supply tube 536 having coupling nuts 538 and 540.

The arrangement 500 also includes a flow meter 560 disposed substantially behind the wall 516 rather than in front of it for monitoring the supply of water. Therefore, the flow meter 560 may be installed prior to the installation of the wall 516. Alternatively, adequate access openings may be made through the wall 516 to enable the flow meter 560 to be disposed behind the wall 516 after the wall 516 is installed.

Figure 7:
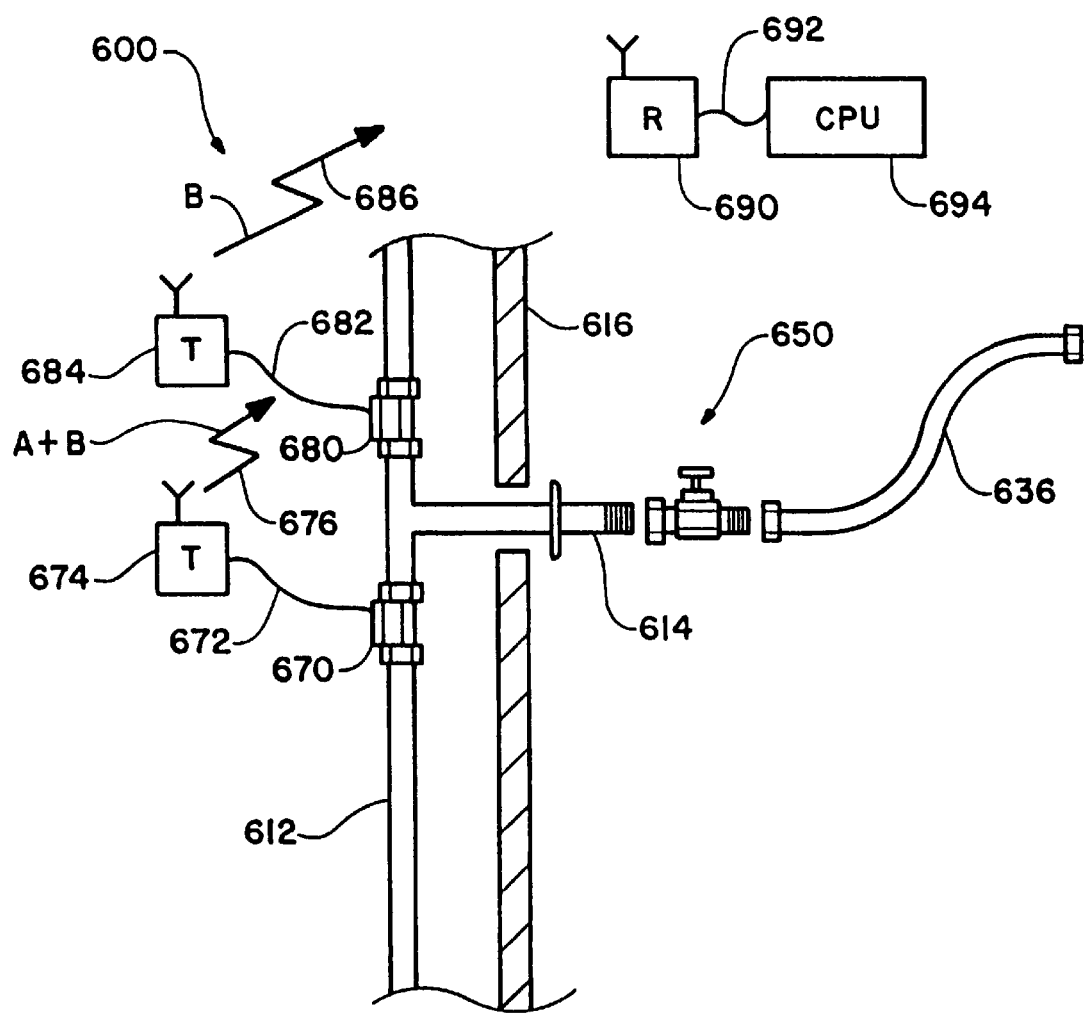
FIG. 7 is an elevation view of another meter arrangement, which is also constructed and installed in accordance with the method and apparatus of the present invention.

Referring now to FIG. 7, there is shown yet another flow meter arrangement 600, which is also constructed and installed in accordance with the present invention. The arrangement 600 includes a pair of flow meters 670 and 680 disposed in fluid communication with a water supply pipe 612 having a stub out pipe 614 extending away therefrom. The stub out pipe 614 extends through a wall 616, and is coupled to a water outlet (not shown) by a shut-off valve 650 and a water supply tube 636.

The meters 670 and 680 are disposed on the upstream side and downstream side, respectively, of the intersection of the stub out pipe 614 with the pipe 612. As shown in FIG. 7, the pipe 612 supplies water to at least two fixtures, one above the other, on at least two different floors of a structure (not shown). Thus, the meter 670 and 680 enables the monitoring of water supplied to all downstream fixtures.

In this regard, meter 670 monitors the supply of water to a fixture A (not shown) coupled to the tube 636 and also to a downstream fixture B (not shown). Meter 680 monitors the supply of water to fixture B only. The difference between the water supplied to both fixtures A and B, and to fixture B only, describes the water supplied to fixture A.

A transmitter 674 is coupled electrically to the meter 670 by conductor 672 to transmit a signal 676 indicative of the water supplied to fixtures A and B. A transmitter 684 is coupled electrically to the meter 680 by conductor 682 to transmit another signal 686 indicative of the water supplied to fixture B.

A remotely located receiver 690 receives the signals 676 and 686, and transmits the signals 676 and 686 to a computer processing unit (CPU) 694 via a conductor 692. The CPU 694 processes the signals to determine the amount of water supplied to fixtures A and B individually based on signals 676 and 686.

It will be understood by one skilled in the art that although the foregoing arrangements 10, 100, 200, 300, 400, 500 and 600 (FIGS. 1–7) are described in connection with a particular fixture or outlet, such as a kitchen sink faucet fixture 25 (FIG. 1), each of the arrangements 10, 100, 200, 300, 400, 500 and 600 may be used in connection with other outlets and still provide remote monitoring capabilities as contemplated in the present invention.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of metering fluid consumption flow in a building structure having a plurality of units, having a plurality of discharge service outlets for dispensing fluids therefrom, the method comprising:

identifying each of the service outlets to be metered in the building structure;

using an individual control valve for each service/outlet;

using a plurality of meters associated individually with said service outlets all disposed within a single unit of said building each meter constructed to monitor the fluid flow from individual ones of the service outlets to be metered so that the fluid discharge consumption at each service outlet is measured;

installing the provided single meter within a given distance from one of the valves for the discharge service outlet to be metered so that the fluid being discharged from its the service outlet is indicated by a meter reading, the meter reading being indicative of the fluid consumed at the service outlet;

electronically sending meter readings indicative of the fluid consumed at each metered discharge service outlet periodically to a remote location; and determining a total consumption of fluid for each unit by accumulating electronically the meter readings received from the plurality of service outlets being metered within said unit of the building structure, responsive to receiving the meter readings remotely therefrom.

2. A method according to claim 1, wherein the meters are each installed upstream of their valves, and wherein said given distance is up to one foot upstream from a given valve.

3. A method according to claim 2, wherein the meters are each installed adjacent to their valves.

4. A method according to claim 1, wherein the meters are each installed downstream of their valves, and said distance is equal to the length of the flow between individual valves and their outlets.

5. A method according to claim 4, wherein the meters are each installed adjacent to their valves.

6. A method according to claim 4, wherein the meters are each installed individually at their outlets.

7. A method according to claim 1, wherein the meters are each installed individually respectively intermediate the valves and their outlets controlled thereby.

8. An apparatus for metering a structural unit of a building, the structural unit having a fluid supply pipe providing a plurality of discharge service outlets within the unit, each service outlet having a single individual control valve therefor, comprising:

a group of meters associated individually with said service outlets all disposed within the single unit of the building, each single meter constructed to monitor fluid flowing from a corresponding single discharge service outlet and to provide a reading indicative of the fluid discharged from its individual service outlet;

means for installing the meters within the unit wherein only a single meter is installed within a given distance from one of the valves so that the meter provides the meter reading indicative of the fluid discharged from its service outlet;

means for sending meter readings indicative of fluid consumed at each metered service outlet remotely therefrom; and means for determining a total consumption of fluid for the unit by accumulating the meter readings from the plurality of service outlets within the unit responsive to receiving the meter readings remotely.

9. An apparatus according to claim 8, wherein the meters are each installed upstream of their valves, and wherein said given distance is up to one foot upstream from a given value.

10. An apparatus according to claim 8, wherein the meters are each installed adjacent to their valves.

11. An apparatus according to claim 8, wherein the meters are each installed downstream of their valves, and said distance is equal to the length of the flow between individual valves and their outlets.

12. An apparatus according to claim 11, wherein the meters are each installed adjacent to their valves.

13. An apparatus according to claim 11, wherein the meter is installed at the outlet.

14. An apparatus according to claim 8, wherein the meters are each installed individually respectively intermediate the valves and their outlets controlled thereby.

15. An apparatus according to claim 8, wherein the meter is installed upstream of the valve at a common supply line for a plurality of units within the building structure, further including another meter being installed upstream of the first-mentioned meter at the common supply line;

means for determining the difference between the readings of the two meters to determine the quantity of fluid flowing through the first-mentioned meter.

16. The apparatus of claim 8 wherein the electrical transmission means comprise wireless transmission.

17. A method for determining the quantity of utility fluid discharge consumption for each of a plurality of structural units where each structural unit is within a single building, and a fluid supply line in the building distributes the fluid to more than one structural unit, each structural unit having a plurality of service discharge outlets, comprising:

identifying the discharge service outlets to be monitored in each structural unit, each discharge service outlet providing an outlet for consuming an amount of utility fluid;

installing a plurality of meters associated individually with said service outlets all disposed within a single unit of said building, each meter being constructed and installed to monitor the fluid discharged from its single service outlet;

generating service outlet meter readings, each meter reading being indicative of the quantity of fluid discharged from its single service outlet;

sending the meter readings indicative of fluid discharged from each metered service outlet therefrom; and determining a consumption of discharged fluid for the plurality of service outlets within said unit being monitored responsive to receiving the meter readings remotely.

18. A method according to claim 17 further including:

metering each service outlet to monitor the fluid being discharged from each service outlet;

generating a signal indicative of the quantity of fluid being discharged from each service outlet electronically;

sending the signals electronically to remote equipment;

determining the quantity of fluid discharged from each metered service outlet; and prorating a utility cost to the structural units in proportion to the quantity of fluid discharged from metered service outlets allocated to each unit.

19. The system according to claim 18 where the fluid is gas.

20. The system according to claim 18 where the fluid is water.

21. A system for determining fluid discharge where a supply pipe is installed within a building unit and a plurality of stub out pipes extend from the supply pipe within the building and including a plurality of discharge service outlets each being individually associated with individual ones of the stub out pipes, each stub out pipe supplying the fluid to its discharge service outlet, comprising:

a group of meters associated individually with said service outlets all disposed within a single building unit, where each meter is constructed for measuring a fluid flow through a stub out pipe and discharged from an individual discharge service outlet;

means for coupling a single one of the meters to each of the stub out pipes so that each of the meters measures the fluid discharge through each stub out pipe;

means for generating a signal indicative of the measured fluid discharge;

remote equipment responsive to at least one generated signal for determining the utility fluid discharge consumption for the plurality of service outlets within said unit; and means for sending electronically the generated signal from the meter to the remote equipment.

22. A system to determine water discharge consumption in a building, the building having a water supply pipe with a sink feed pipe providing water to a sink and a toilet feed pipe providing water to a toilet, comprising:

a sink meter coupled to the sink feed pipe for determining the quantity of water discharged into the sink and providing a sink flow signal indicative of the quantity of water discharged into the sink:

a toilet meter coupled to the toilet feed pipe for determining the quantity of water discharged into the toilet and providing a toilet flow signal indicative of the quantity of water discharged into the toilet;

a processor receiving the sink flow signal and the toilet flow signal and generating a signal indicative of the water consumption of the sink and toilet; and means for sending electronically the flow signals from the meters to the remote processor.

* * * * *